United States Patent
Fujimoto

(10) Patent No.: US 7,792,999 B2
(45) Date of Patent: Sep. 7, 2010

(54) IMAGE DATA SERVER

(75) Inventor: Munehiko Fujimoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 147 days.

(21) Appl. No.: 12/256,824

(22) Filed: Oct. 23, 2008

(65) Prior Publication Data

US 2009/0112980 A1  Apr. 30, 2009

(30) Foreign Application Priority Data

Oct. 24, 2007  (JP) .............................. 2007-276395

(51) Int. Cl.
  G06F 15/16 (2006.01)
  G06F 15/173 (2006.01)
(52) U.S. Cl. ................. 709/246; 709/203; 709/218; 709/224
(58) Field of Classification Search ........... 709/203, 709/218, 224, 246; 715/718; 386/123; 382/298; 348/556; 345/660
See application file for complete search history.

(56) References Cited

U.S. PATENT DOCUMENTS

| 7,212,218 | B2 * | 5/2007 | Suzuki et al. ............... 345/660 |
| 2004/0036805 | A1 * | 2/2004 | Nevins et al. ............... 348/556 |
| 2005/0180858 | A1 * | 8/2005 | Halgas, Jr. ............... 417/53 |
| 2005/0190202 | A1 * | 9/2005 | Suzuki et al. ............... 345/660 |
| 2005/0262444 | A1 * | 11/2005 | Kizaki et al. ............... 715/718 |
| 2005/0262445 | A1 * | 11/2005 | Kizaki et al. ............... 715/718 |
| 2006/0002687 | A1 * | 1/2006 | Thrall et al. ............... 386/123 |
| 2006/0187352 | A1 * | 8/2006 | Kuo et al. ............... 348/558 |
| 2007/0150532 | A1 * | 6/2007 | Feldis et al. ............... 708/400 |
| 2008/0260290 | A1 * | 10/2008 | Velthoven et al. ............... 382/298 |

FOREIGN PATENT DOCUMENTS

| JP | 2006-303816 A | 11/2006 |
| JP | 2007-11807 A | 1/2007 |

* cited by examiner

*Primary Examiner*—Quang N. Nguyen
(74) *Attorney, Agent, or Firm*—Crowell & Moring LLP

(57) ABSTRACT

Disclosed is an image data server which transmits image data through a communication network to a client apparatus for displaying an image on a display screen, the image data server including: an obtainment section to obtain aspect ratio information of the display screen from the client apparatus through the communication network; a specification section to specify a display screen area where the image based on the image data is not displayed in the display screen of the client apparatus when the image is output to the client apparatus according to the aspect ratio information obtained by the obtainment section; a creation section to create combined data by combining background image data corresponding to the display screen area specified by the specification section with the image data; and a transmission section to transmit the combined data created by the creation section through the communication network to the client apparatus.

3 Claims, 3 Drawing Sheets

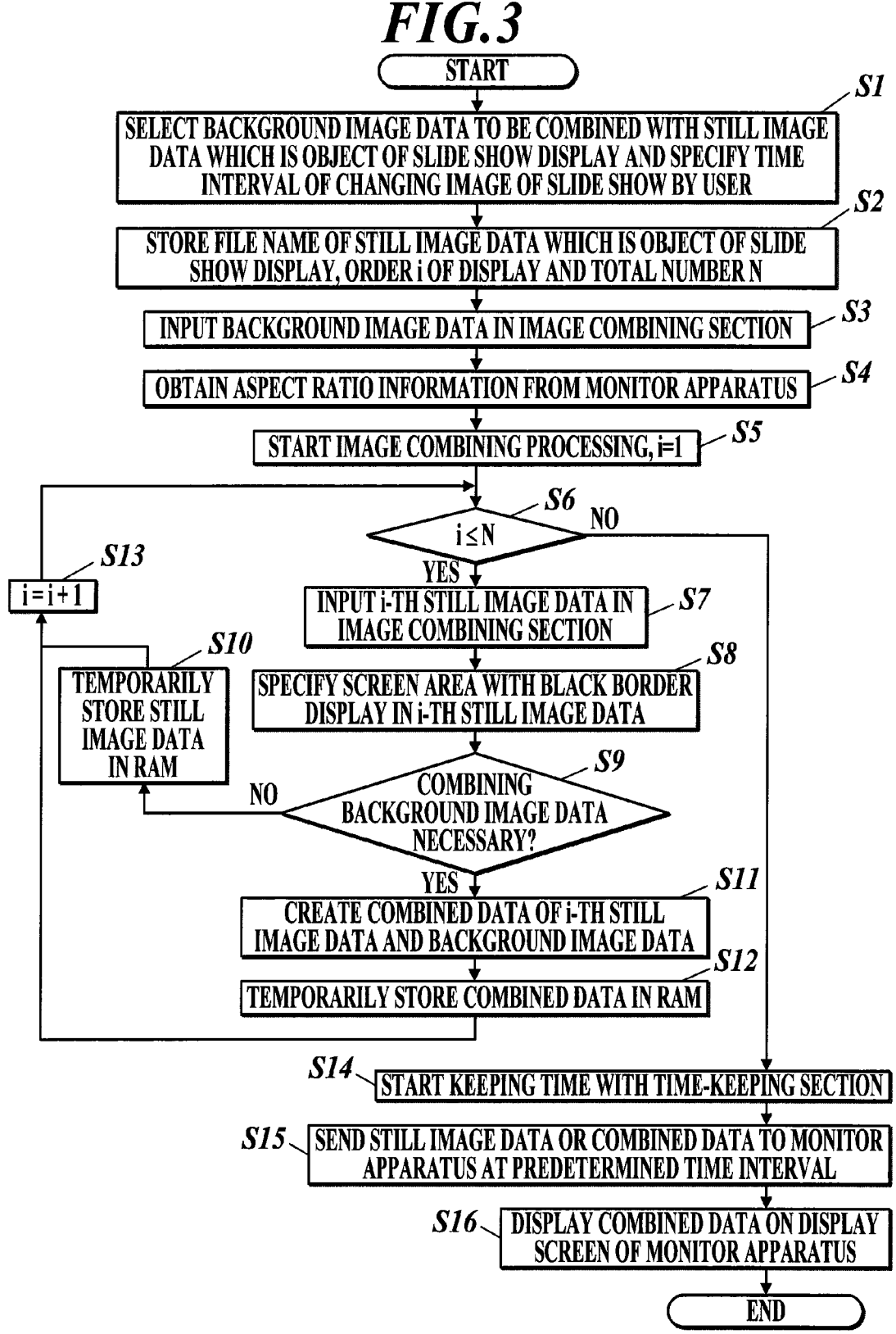

IMAGE DATA SERVER

BACKGROUND OF THE INVENTION

1. Field of the Invention

The present invention relates to an image data server.

2. Description of Related Art

There is a well-known technique where an image player such as a digital camera can combine a background image to an image to be played and automatically continuously play the image when the image photographed by the player is displayed on the player's liquid crystal display screen (for example, Japanese Patent Application Laid-Open Publication No. 2006-303816).

There is also a well-known technique where in a moving image recorder/player, SKIN design or background design of an application can be changed to a design of a user's preference, and the design is displayed on the display screen of the display apparatus according to the aspect ratio specified on the moving image recorder/player (for example, Japanese Patent Application Laid-Open Publication No. 2007-11807).

However, with the disclosed techniques described above, only an image with a specific aspect ratio can be displayed on the entire display screen, and in a display screen which does not correspond to the aspect ratio, there is a problem such as the image cannot be displayed, the image is displayed with a portion cut off, etc.

SUMMARY OF THE INVENTION

It is, therefore, a main object of the present invention to provide an image data server which can display a suitable image on an entire display screen of a client apparatus for displaying an image on its display screen depending on aspect ratio information.

According to a first aspect of the present invention, there is provided an image data server which transmits image data through a communication network to a client apparatus for displaying an image on a display screen, the image data server comprising:

an obtainment section to obtain aspect ratio information of the display screen of the client apparatus from the client apparatus through the communication network;

a specification section to specify a display screen area where the image based on the image data is not displayed in the display screen of the client apparatus when the image is output to the client apparatus according to the aspect ratio information obtained by the obtainment section;

a creation section to create combined data by combining background image data corresponding to the display screen area specified by the specification section with the image data; and a transmission section to transmit the combined data created by the creation section through the communication network to the client apparatus.

According to a second aspect of the present invention, there is provided an image data server which transmits still image data through a communication network to a client apparatus for displaying an image on a display screen, the image data server comprising:

an obtainment section to obtain aspect ratio information of the display screen of the client apparatus from the client apparatus through the communication network;

a specification section to specify a display screen area where the image based on the still image data is not displayed in the display screen of the client apparatus when the image is output to the client apparatus according to the aspect ratio information obtained by the obtainment section;

a creation section to create combined data by combining background image data corresponding to the display screen area specified by the specification section with the still image data;

a transmission section to transmit one or a plurality of pieces of the combined data created by the creation section in a slideshow format through the communication network to the client apparatus;

an image obtainment section to obtain image data through the communication network; and a storage section to store the image data obtained by the image obtainment section as background image data in a still image data format, wherein the creation section combines the background image data stored in the storage section with the still image data.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIG. 3 is a flowchart describing an operation performed in a background image combining processing and a slideshow displaying processing of the present embodiment.

DESCRIPTION OF THE PREFERRED EMBODIMENTS

The best mode for carrying out the image data server according to the present invention will be explained in detail with reference to the drawings. However, the scope of the invention is not limited to the illustrated examples.

Figure 1:
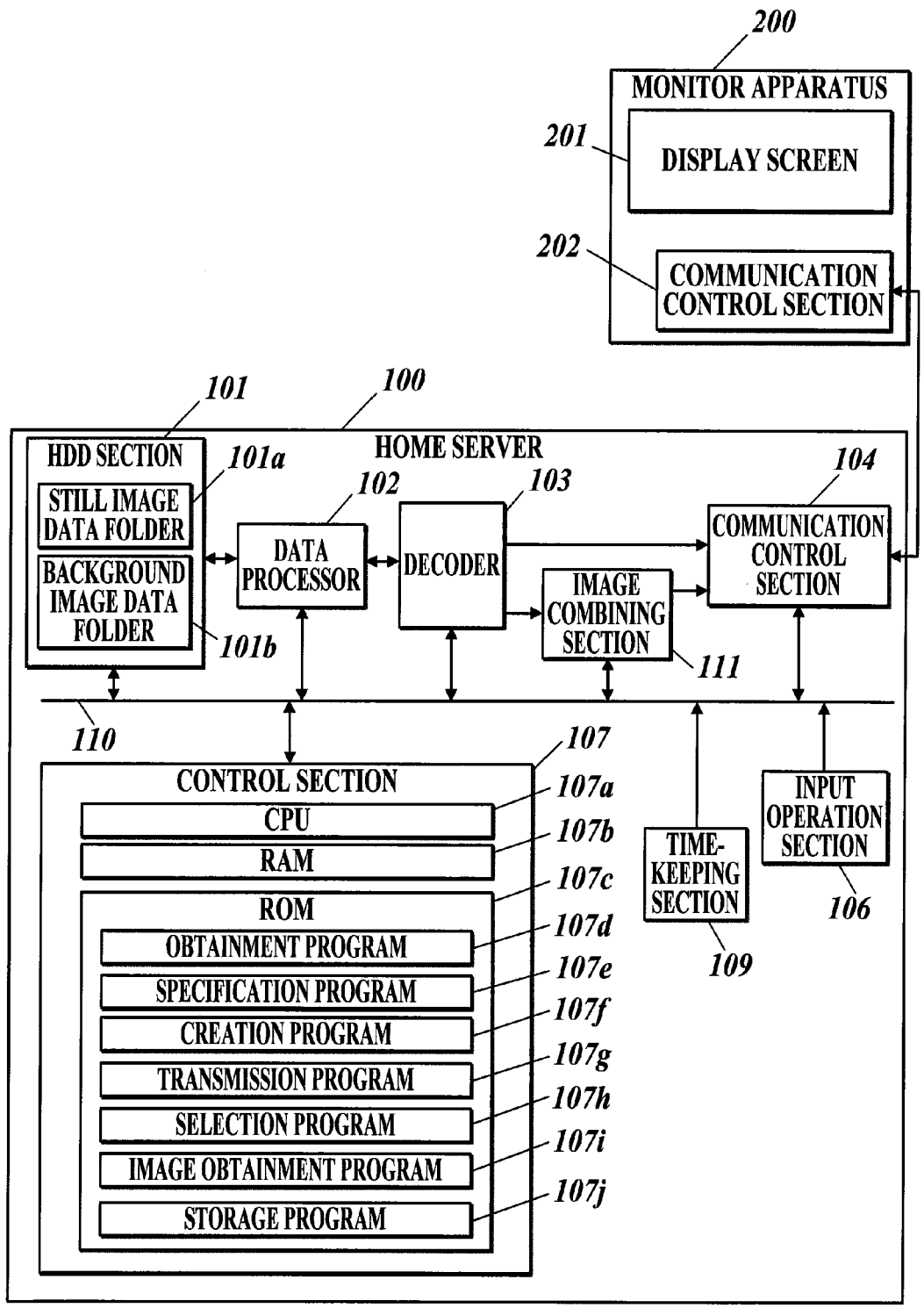
FIG. 1 is a block diagram showing a structure of a main section of an image data server and a client apparatus according to the present embodiment.

As shown in FIG. 1, the image data server includes, for example, a home server 100 and a client apparatus includes, for example, a monitor apparatus 200 holding aspect ratio information. For example, the home server 100 and the monitor apparatus 200 connected to the home server 100 conforms to Digital Living Network Alliance (DLNA) guideline and can transmit and receive information between each other through a Local Area Network (LAN).

The home server 100 includes an HDD section 101 for storing still image data and background image data as image data, a data processor 102 for setting an input and output path of the image data and outputting the still image data and background image data loaded from the HDD section 101 to the sections of the apparatus, a decoder 103 for performing a predetermined decoding processing on the still image data and the background image data output from the HDD section 101, an image combining section 111 for performing image combining processing on still image data and background image data, a communication control section 104 for obtaining aspect ratio information of the display screen from the monitor apparatus 200 and an image to be displayed on the display screen 201 of the monitor apparatus 200 as image data, an input operation section 106 for a user to input various input operation signals, a control section 107 for centrally controlling the sections of the home server 100, a time-keeping section 109 for keeping the present time, and a control bus 110 for connecting the sections of the apparatus.

The HDD section 101 stores the still image data and the background image data, displayed on the display screen 201 of the monitor apparatus 200, in a still image data folder 101a and a background image data folder 101b, respectively. The HDD section 101 adopts for example, an AT Attachment (ATA) standard, and includes a built-in hard disk (not shown), a magnetic head (not shown) for storing data in the hard disk or reading out moving image data stored in the hard disk, and a driving section (not shown) for rotating the hard disk and moving the magnetic head in a radial direction of the hard disk.

The data processor 102 sets an input and output path of the still image data and the background image data and controls the input and output of data according to an output signal from a later-described CPU 107a.

Specifically, for example, when a user instructs a home server 100 to perform a still image data displaying processing or a slideshow displaying processing, the data processor 102 outputs the still image data stored in the still image data folder 101a of the HDD section 101 and the background image data stored in the background image data folder 101b to the decoder 103.

The decoder 103 performs, for example, decoding processing on the still image data and the background image data.

After the decoding processing is performed on the still image data and the background image data by the decoder 103, the data is output to the image combining section 111 and image combining processing is performed.

The communication control section 104 includes, for example, a LAN port, and transmits and receives various contents between another AV device which conforms to DLNA guideline through a LAN cable, etc. and can perform bidirectional data communication.

Specifically, the communication control section 104 is connected to a later-described communication control section 202 of the monitor apparatus 200 which conforms to the DLNA guideline through a LAN cable, etc., and can transmit and receive image data between the monitor apparatus 200. The communication control section 104 can for example, receive aspect ratio information of the monitor apparatus 200 described in Extensible Markup Language (XML) format according to Universal Plug and Play (UPnP) standard through Hyper Text Transfer Protocol (HTTP).

The input operation section 106 includes for example, a keyboard, etc. The input operation section 106 includes various keys for the user to operate the home server 100 such as "image display" or "slideshow display" concerning the various contents stored in the home server 100 and when the user pushes down a key, an input operation key signal is generated and the input operation key signal is output to the control section 107.

The control section 107 includes a Central Processing Unit (CPU) 107a, a Random Access Memory (RAM) 107b, Read Only Memory (ROM) 107c and the like.

The CPU 107a performs various programs stored in the ROM 107c according to an input signal input from various sections of the home server 100, input operation signal input by pressing down various keys of the input operation section 106 and the like, and outputs the output signal etc. generated by performing the various programs to the sections of the home server 100 to centrally control the general operation of the home server 100.

The RAM (Random Access Memory) 107b includes, for example, a program storage area (not shown) for developing a processing program and the like performed by the CPU 107a and a data storage area (not shown) for storing input data, processing result generated when the processing program is performed, and the like.

The ROM (Read Only Memory) 107c includes, for example a nonvolatile memory and includes a program storage area and the like. The program storage area stores various programs such as obtainment program 107d, specification program 107e, creation program 107f, transmission program 107g, selection program 107h, image obtainment program 107i, storage program 107j, and the like.

The obtainment program 107d is a program for allowing the CPU 107a to realize a function of obtaining aspect ratio information of the display screen 201 of the monitor apparatus 200 through the communication control section 104.

In other words, by performing the obtainment program 107d, the CPU 107a functions as an obtainment section by for example, transmitting a transmission request command of the aspect ratio information of the display screen 201 of the monitor apparatus 200 through the communication control section 104 to obtain aspect ratio information of the display screen 201 of the monitor apparatus 200 described in an XML format from the monitor apparatus 200 through the communication control section 104.

The specification program 107e is a program for allowing the CPU 107a to realize a function of specifying a display screen area where the still image is not displayed when the still image data output to the monitor apparatus 200 is displayed on the display screen 201 of the monitor apparatus 200 according to the aspect ratio information obtained by the obtainment program 107d.

In other words, by performing the specification program 107e, the CPU 107a functions as a specification section by specifying an area typically displayed with a black border as a display screen area where the still image is not displayed when still image data with an aspect ratio different from the aspect ratio of the display screen 201 of the monitor apparatus 200 is displayed on the display screen 201 of the monitor apparatus 200.

Figure 2A:
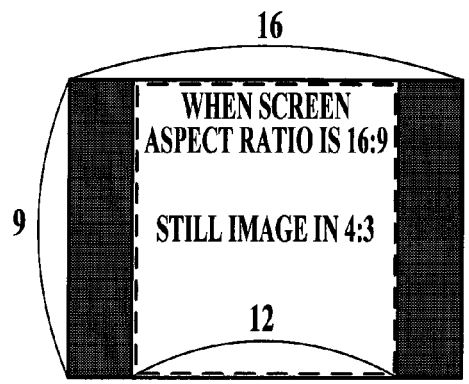
FIG. 2A to 2D are diagrams showing a display screen displaying a still image stretched according to an aspect ratio of a display screen of the present embodiment.

Specifically, as shown in FIG. 2A, in a case where the aspect ratio of the display screen 201 of the monitor apparatus 200 is 16:9 and the aspect ratio of the still image data is 4:3, for example, when the still image is stretched to match the maximum value of the vertical length of the display screen and the still image with an aspect ratio 12:9 is created, a black border where the still image is not displayed is created on both left and right sides of the still image. Therefore, the specification program 107e functions as a specification section for specifying the position, size, etc. of the black border covering the display screen.

Figure 2B:
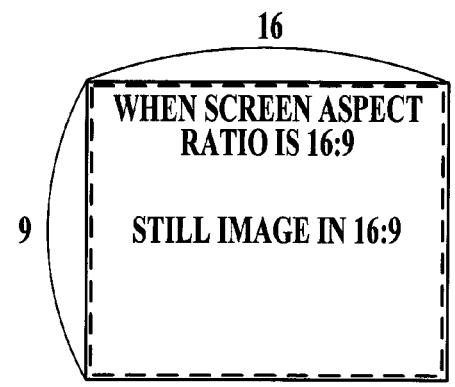
Figure 2C:
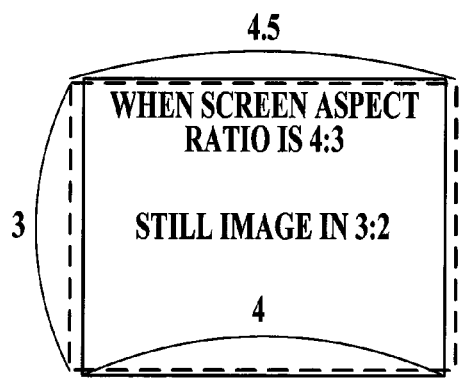
Figure 2D:
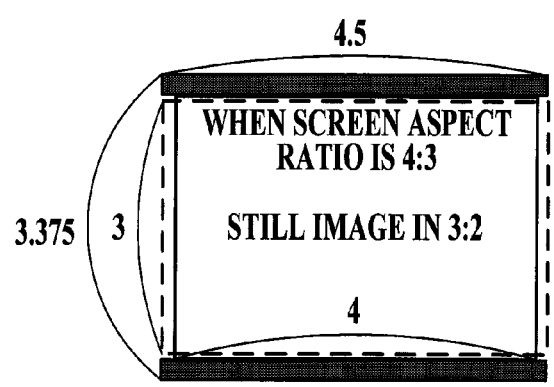

As shown in FIG. 2B, in a case where the aspect ratio of the display screen 201 of the monitor apparatus 200 and the aspect ratio of the still image data are the same, the black border is not created. As shown in FIG. 2C, in a case where the aspect ratio of the display screen 201 of the monitor apparatus 200 is 4:3 and the aspect ratio of the still image data is 3:2, for example, when the still image is stretched to match the maximum value of the vertical length of the display screen, a still image with an aspect ratio of 4.5:3 is created and the still image is displayed with the still image pushed off in the horizontal direction of the display screen. Therefore, as shown in FIG. 2D, a display screen area where the still image data is not displayed can be provided in the upper and lower portions of the display screen so that the aspect ratio of the still image data is the same as 4:3 (=4.5:3.375) and this display screen area can be specified by the specification program 107e.

There may also be a case where the aspect ratio of the display screen 201 of the monitor apparatus 200 is 4:3 and the aspect ratio of the still image data is 5:3, and when the still image data is displayed in this aspect ratio, the still image is pushed off of the display screen 201. In this case, for example, the CPU 107a reduces the still image data to match the maximum value of the horizontal length of the display screen and creates still image data with the aspect ratio of 4:2.4 (=5:3). The CPU 107a can allow the specification program 107e to specify the display screen area where the still image data is not displayed in the upper and lower portions of the display screen created on the display screen 201 by the reduction.

The creation program 107f is a program for allowing the CPU 107a to realize a function of creating combined data by combining background image data corresponding to the display screen area specified by the specification program 107e as an area where the still image is not displayed with the still image data corresponding to the still image using the image combining section 111.

In other words, by performing the creation program 107f, the CPU 107a functions as a creation section by performing decoding processing with the decoder on the still image data and the background image data stored in the background image data folder 101b of the HDD section 101, selected by the later-described selection program 107h and corresponding to the position and size of the display screen area where the still image is not displayed, then inputting the data in the image combining section 111 to create combined data of the background image data and still image data in the image combining section 111.

The transmission program 107g is a program for allowing the CPU 107a to realize a function of transmitting the one or a plurality of pieces of combined data created with the creation program 107f in a slideshow format to the monitor apparatus 200 through the communication control section 104.

In other words, by performing the transmission program 107g, the CPU 107a functions as a transmitting section by transmitting the combined data of the background image data and the still image data in a slideshow format. Here, the slideshow format is a format of changing one or a plurality of pieces of combined data displayed on the display screen 201 of the monitor apparatus 200 according to an operation of the input operation section 106 by the user or at a predetermined time interval pre-set by the user and kept by the time-keeping section 109.

The selection program 107h is a program for allowing the CPU 107a to realize a function of selecting specific background image data among the one or a plurality of pieces of background image data stored in the background image data folder 101b of the HDD section 101.

In other words, by performing the selection program 107h, the CPU 107a functions as a selection section by displaying on the display screen 201 of the monitor apparatus 200 one or a plurality of pieces of background image data stored in the background image data folder 101b of the HDD section 101 so that the user can select from the displayed data the background image data to be combined with the still image data in the creation program 107f using the input operation section 106.

The background image data to be selected by the user can be selected with respect to each still image data or the same background image data can be selected for one or a plurality of pieces of still image data displayed in a slideshow format.

Also, input of selection instruction can be done on the monitor apparatus 200 using a remote controller (not shown) provided with the monitor apparatus and the selection instruction signal is transmitted from the monitor apparatus 200 through the LAN to the home server 100.

The image obtainment program 107i is a program for allowing the CPU 107a to realize a function of obtaining image data stored by another AV device through the communication control section 104.

In other words, by performing the image obtainment program 107i, the CPU 107a functions as an image obtainment section by obtaining image data stored by another AV device through the communication control section 104 when the home server 100 is connected to another AV device which conforms to the DLNA guideline or to a network.

The image obtainment program 107i can be a program for allowing the CPU 107a to realize a function of obtaining through the communication control section 104 the image displayed on the display screen 201 of the monitor apparatus 200 as image data temporarily stored in a buffer (not shown) or the like provided in the monitor apparatus 200.

The storage program 107j is a program for allowing the CPU 107a to realize a function of storing the image data obtained by the image obtainment program 107i to be stored as background image data in the HDD section 101.

In other words, by performing the storage program 107j, the CPU 107a functions as a storage section by converting the image data obtained by the image obtainment program 107i to the same file format as the background image data stored in the background image data folder 101b of the HDD section 101 to store the data in the background image data folder 101b.

The time-keeping section 109 keeps the present time and outputs the kept time data to the control section 107.

The image combining section 111 combines a plurality of image data according to input of specification of image data to be combined, position and size of combining, instruction of trimming or replacement of image file format, etc.

Specifically, the still image data stored in the HDD section 101 and the background image data corresponding to the display screen area specified by the specification program 107f as the area where the still image is not displayed and selected by the selection program are combined to create combined data, and the created combined data is temporarily stored in the RAM 107b. The combined data stored in the RAM 107b is transmitted to the monitor apparatus 200 through the communication control section 104 according to the output signal from the CPU 107a.

The monitor apparatus 200 includes for example, a liquid crystal display, and includes the display screen 201, communication control section 202, a memory (not shown) for storing the buffer and aspect ratio information and a control section (not shown) for controlling display of an image on the display screen. The buffer temporarily stores the image data of the image displayed on the display screen 201 and transmits the image data to the home server 100 according to the image obtainment program 107i performed by the home server 100.

The display screen 201 includes, for example, a liquid crystal display screen and is formed in a display screen size with an aspect ratio of 16:9.

The communication control section 202 includes, for example, a LAN port, etc., and transmits and receives various contents between another AV device which conforms to DLNA guideline through a LAN cable, etc. and can perform bidirectional data communication.

Specifically, the communication control section 202 is connected to the communication control section 104 of the home server 100 which conforms to the DLNA guideline through a LAN cable, etc., and can be used, for example, to transmit aspect ratio information of the device described in XML format according to UPnP standard or to transmit image data etc., and to receive image data of the home server 100 transmitted from the home server 100.

Next, the background image combining processing and slideshow displaying processing of the home server 100 will be described with reference to the flowchart of FIG. 3.

First, the user operates the input operation section 106 to select slideshow displaying processing of the still image, then selects one or a plurality of pieces of still image data which is to be the object of slideshow display, and then specifies the time interval of switching the image displayed in the slideshow. When the slideshow displaying processing is selected, the CPU 107a performs the selection program 107h and displays the background image on the display screen 201 of the monitor apparatus 200 so that a user may select the background image data to be combined with the still image data (step S1). Here, the background image data to be selected includes background image data previously obtained from another AV device when the CPU 107a performs the image obtainment program 107i or the storage program 107j according to the user's request.

Next, the CPU 107a stores in the RAM 107b a file name of the still image data which is an object of the slideshow display and the order (hereinafter referred to as, i) displayed in the slideshow and the total number (hereinafter referred to as, total number N) of still image data to be displayed in the slideshow selected by the user in step S1 in a data file format (step S2).

Next, the CPU 107a inputs the background image data selected by the user in step S1 from the background image data folder 101b of the HDD section 101 to the image combining section 111 (step S3).

Next, by performing the obtainment program 107d, the CPU 107a obtains the aspect ratio information of the display screen 201 of the monitor apparatus 200 from the monitor apparatus 200 through the communication control section 104 (step S4).

Next, the CPU 107a starts the image combining processing (step S5). The initial value of the order i of the still image data is to be 1.

Next, the CPU 107a judges whether or not the order i of the still image data is the total number N or lower (step S6). When the order i of the still image data exceeds the total number N, the processing advances to step S14 (step S6; No).

On the other hand, when the order i of the still image data is the total number N or lower (step S6; Yes), the CPU 107a detects the i-th still image data file from the data file stored in the RAM 107b in step S2 and inputs the data file from the still image data folder 101b of the HDD section 101 to the image combining section 111 (step S7).

Next, by performing the specification program 107e, the CPU 107a specifies the display screen area where the still image is not displayed on the display screen 201 of the monitor apparatus 200 in the i-th still image data (display screen area with black border display) (step S8).

Next, the CPU 107a judges whether or not the i-th still image data needs to be combined with the background image data (step S9). In other words, the CPU 107a determines whether there is a display screen area with a black border display specified in step S8 (the aspect ratio of the display screen 201 and the aspect ratio of the i-th still image data are different) or there is not a display screen area displayed with a black border (the aspect ratio of the display screen 201 and the aspect ratio of the i-th still image data are the same).

In step S9, when the CPU 107a determines the i-th still image data does not need to be combined with the background image data (step S9; No), the i-th still image data is not combined with the background image data and the i-th still image data is temporarily stored in the RAM 107b (step S10).

On the other hand, when the CPU 107a determines the i-th still image data needs to be combined with the background image data (step S9; Yes), by performing the creation program 107f, the i-th still image data is combined with the background image data to create combined data in the image combining section 111 (step S11).

Then, the CPU 107a temporarily stores the combined image data of the i-th still image data in the RAM 107b (step S12).

Next, 1 is added to the value i (step S13) and the processing of step S6 to step S13 is repeated until i reaches the total number N.

When the order i of the still image data exceeds the total number N (step S6; No), in order to perform the slideshow displaying processing, the CPU 107a starts keeping time with the time-keeping section 109 and adjusts the switching time interval of the slideshow image specified by the user in step S2 (step S14).

Next, by performing the transmission program 107g, the CPU 107a transmits the still image data or the combined data to the monitor apparatus 200 in the predetermined time interval kept in step S14 (step S15).

By displaying the still image data or combined data transmitted in step S15 on the display screen 201 of the monitor apparatus 200 (step S16), a slideshow display of only still image which does not have a display screen area including black border display can be performed.

As described above, when the image data output to the monitor apparatus 200 is displayed on the display screen 201 of the monitor apparatus 200, the home server 100 of the present invention specifies the display screen area where the image is not displayed according to the aspect ratio information obtained from the monitor apparatus 200 through the network, creates combined data of the background image data corresponding to the display screen area and the image data combined when necessary, and transmits the combined data to the monitor apparatus 200 so that the image can be displayed on the entire display screen 201 of the monitor apparatus 200.

Therefore, the home server 100 is an image data server which can display a suitable image according to aspect ratio information on the entire display screen of the client apparatus for displaying the image on its display screen.

In other words, by combining background image data for enhancing visual effect of the image data to be displayed, such as combining background image data of a frame when the image data the user is to display is a photograph image, or by combining background image data associated with the image data to be displayed, such as combining background image data of a picture of an ocean when the photograph image is a photograph of a ship, to a display screen area where only a black border is displayed on the display screen 201, entertainment and visibility of the image when the user performs image display can be enhanced.

When the image data is still image data, the home server 100 can transmit one or a plurality of pieces of combined data based on the still image data in a slideshow format to the monitor apparatus 200.

In other words, when the user allows the home server 100 to perform the slideshow of the still image, the slideshow can be performed with the combined image data always displayed on the entire display screen 201 of the monitor apparatus 200. Therefore, the entertainment of the slideshow to the user and the unity of the slideshow itself can be enhanced.

The home server 100 enables the user to select the background image data to be combined with the image data.

In other words, by selecting the background image data which the user believes is the most suitable for the image data from, for example, the previously set plurality of background image data, and creating combined data, the user can enjoy image display and slideshow display according to the user's preference.

The home server 100 can obtain an image stored in another AV device as image data from the AV device through the network and use the image data as background image data in creating combined data.

In other words, when the user desires to use specific background image data or background image data different from the previously set background image data, an image stored in another AV device can be used as background image data. Consequently, the user's range of option of the background image data broadens, and the user can enjoy image display and slideshow display more according to the user's preference.

The client apparatus of the present invention is not limited to a liquid crystal display device, and can be any device which can display an image on the display screen and which can transmit and receive information with an image data server through a communication network, such as a CRT display device or a plasma display device.

The image data and the background image data is not limited to still image data and can be moving image data.

The monitor apparatus 200 is not limited to a liquid crystal display device with a display screen size with an aspect ratio of 16:9 and can be a liquid crystal display device with a display screen size with another aspect ratio (for example aspect ratio 4:3).

The selection section is not limited to the selection program 107h of the present embodiment, and the CPU 107a can automatically select background image data from a classification of the categorized background image data selected by the user. Specifically, in the above-described case, by comprising a folder for each category such as place, person, background, age, type/color/shape of a thing, etc. as a sub-folder of the background image data folder 101b and allowing the user to select a category, the CPU 107a can randomly select a background image data associated with the category from the sub-folder and combine different background image data with respect to each still image data or combine the same background image data to all still image data.

In addition to the combined data, the transmission program 107g can also transmit music data to the monitor apparatus 200 at the same time and as the above-described category, a folder with respect to each music category can be provided to switch the background image data linked with the music category output when the slideshow is displayed.

With this, the user's trouble of selecting background image data can be saved, and since different background image data is combined according to image display, slideshow display and music category, the user's visual entertainment is enhanced.

According to a first aspect of the preferred embodiments, there is provided an image data server which transmits image data through a communication network to a client apparatus for displaying an image on a display screen, the image data server comprising:

an obtainment section to obtain aspect ratio information of the display screen of the client apparatus from the client apparatus through the communication network;

a specification section to specify a display screen area where the image based on the image data is not displayed in the display screen of the client apparatus when the image is output to the client apparatus according to the aspect ratio information obtained by the obtainment section;

a creation section to create combined data by combining background image data corresponding to the display screen area specified by the specification section with the image data; and a transmission section to transmit the combined data created by the creation section through the communication network to the client apparatus.

Preferably, in the image data server, the image data is still image data; and the transmission section transmits one or a plurality of pieces of the combined data in a slideshow format to the client apparatus.

Preferably, the image data server further comprises:

a selection section to select background image data previously set associated with the image data, wherein the creation section combines the image data with the background image data selected by the selection section.

Preferably, the image data server further comprises:

an image obtainment section to obtain image data through the communication network; and a storage section to store the image data obtained by the image obtainment section as background image data, wherein the creation section combines the background image data stored in the storage section with the image data of the image to be displayed.

According to a second aspect of the preferred embodiments, there is provided an image data server which transmits still image data through a communication network to a client apparatus for displaying an image on a display screen, the image data server comprising:

an obtainment section to obtain aspect ratio information of the display screen of the client apparatus from the client apparatus through the communication network;

a specification section to specify a display screen area where the image based on the still image data is not displayed in the display screen of the client apparatus when the image is output to the client apparatus according to the aspect ratio information obtained by the obtainment section;

a creation section to create combined data by combining background image data corresponding to the display screen area specified by the specification section with the still image data;

a transmission section to transmit one or a plurality of pieces of the combined data created by the creation section in a slideshow format through the communication network to the client apparatus;

an image obtainment section to obtain image data through the communication network; and a storage section to store the image data obtained by the image obtainment section as background image data in a still image data format, wherein the creation section combines the background image data stored in the storage section with the still image data.

According to these aspects, the image data server obtains aspect ratio information from the client apparatus through the communication network, specifies the display screen area where the image is not displayed on the display screen based on the aspect ratio when the image data is output to the client apparatus, combines background image data corresponding to the display screen area with the image data output to the client apparatus, and outputs the combined data to the client apparatus. Consequently, the image can be displayed on the entire display screen of the client apparatus.

Therefore, a preferred embodiment of the present invention is an image data server which can display a suitable image according to aspect ratio information on an entire display screen of a client apparatus for displaying an image on its display screen.

The entire disclosure of Japanese Patent Application No. 2007-276395 filed on Oct. 24, 2007 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image data server which transmits image data through a communication network to a client apparatus for displaying an image on a display screen, the image data server comprising:
   a central processing unit (CPU), the CPU being operatively configured to function as:
      an obtainment section that obtains aspect ratio information of the display screen of the client apparatus from the client apparatus through the communication network;
      a specification section that specifies a display screen area where the image based on the image data is not displayed in the display screen of the client apparatus when the image is output to the client apparatus according to the aspect ratio information obtained by the obtainment section;
      a creation section that creates combined data by combining background image data corresponding to the display screen area specified by the specification section with the image data;
      a transmission section that transmits the combined data created by the creation section through the communication network to the client apparatus;
      an image obtainment section that obtains image data through the communication network;
      a storage section that stores the image data obtained by the image obtainment section as background image data,
   wherein the creation section combines the background image data stored in the storage section with the image data to be displayed; and
      a selection section selects background image data previously set associated with the image data, wherein the creation section combines the image data with the background image data selected by the selection section.

2. The image data server according to claim 1, wherein,
   the image data is still image data; and
   the transmission section transmits one or a plurality of pieces of the combined data in a slideshow format to the client apparatus.

3. An image data server which transmits still image data through a communication network to a client apparatus for displaying an image on a display screen, the image data server comprising:
   a central processing unit (CPU), the CPU being operatively configured to function as:
      an obtainment section that obtains aspect ratio information of the display screen of the client apparatus from the client apparatus through the communication network;
      a specification section that specifies a display screen area where the image based on the still image data is not displayed in the display screen of the client apparatus when the image is output to the client apparatus according to the aspect ratio information obtained by the obtainment section;
      a creation section that creates combined data by combining background image data corresponding to the display screen area specified by the specification section with the still image data;
      a transmission section that transmits one or a plurality of pieces of the combined data created by the creation section in a slideshow format through the communication network to the client apparatus;
      an image obtainment section that obtains image data through the communication network;
      a storage section that stores the image data obtained by the image obtainment section as background image data in a still image data format,
   wherein the creation section combines the background image data stored in the storage section with the still image data to be displayed; and
      a selection section selects background image data previously set associated with the image data, wherein the creation section combines the still image data with the background image data selected by the selection section.

* * * * *